US012677354B2

(12) United States Patent
Oshima et al.

(10) Patent No.: US 12,677,354 B2
(45) Date of Patent: Jul. 7, 2026

(54) WIRING SHEET

(71) Applicant: LINTEC CORPORATION, Tokyo (JP)

(72) Inventors: Takuya Oshima, Tokyo (JP); Takashi Morioka, Tokyo (JP)

(73) Assignee: LINTEC Corportaion, Tokyo (JP)

( * ) Notice: Subject to any disclaimer, the term of this patent is extended or adjusted under 35 U.S.C. 154(b) by 840 days.

(21) Appl. No.: 17/923,486

(22) PCT Filed: May 6, 2021

(86) PCT No.: PCT/JP2021/017395

§ 371 (c)(1),
(2) Date: Nov. 4, 2022

(87) PCT Pub. No.: WO2021/225142

PCT Pub. Date: Nov. 11, 2021

(65) Prior Publication Data

US 2023/0078492 A1 Mar. 16, 2023

(30) Foreign Application Priority Data

May 8, 2020 (JP) ................................ 2020-082584

(51) Int. Cl.

*H05B 3/12* (2006.01)
*H05B 3/03* (2006.01)
*H05B 3/20* (2006.01)

(52) U.S. Cl.

CPC ................ *H05B 3/12* (2013.01); *H05B 3/03* (2013.01); *H05B 3/20* (2013.01)

(58) Field of Classification Search

CPC ... H05B 3/12; H05B 3/03; H05B 3/20; H05B 3/267; H05B 2203/014; H05B 3/286;
(Continued)

(56) References Cited

U.S. PATENT DOCUMENTS

2004/0241402 A1* 12/2004 Kawate ................ H05K 3/4046 428/209
2006/0154078 A1* 7/2006 Watanabe .................. C09J 7/35 525/107
(Continued)

FOREIGN PATENT DOCUMENTS

CN 103328595 A 9/2013
CN 109415254 A 3/2019
(Continued)

OTHER PUBLICATIONS

Office Action received in corresponding Chinese Patent Application No. 202180034014.3, issued May 23, 2025.
(Continued)

*Primary Examiner* — Elizabeth M Kerr
*Assistant Examiner* — Keith Brian Assante
(74) *Attorney, Agent, or Firm* — RIMON P.C.

(57) ABSTRACT

A wiring sheet includes: a pseudo sheet structure including a plurality of conductive linear bodies arranged at intervals; a cured product layer supporting the pseudo sheet structure; and a pair of electrodes in direct contact with the conductive linear bodies. The cured product layer is formed from a cured product of a curable adhesive agent, and a storage modulus at 23 degrees C. of the cured product layer is in a range from $5.0 \times 10^6$ Pa to $1.0 \times 10^{10}$ Pa.

11 Claims, 3 Drawing Sheets

(58) Field of Classification Search
CPC .................. B32B 2307/54; B32B 3/08; B32B 2307/7376; B32B 15/02
See application file for complete search history.

(56) References Cited

U.S. PATENT DOCUMENTS

| | | | | |
|---|---|---|---|---|
| 2013/0251619 | A1 | 9/2013 | Rikihisa et al. | |
| 2017/0199412 | A1* | 7/2017 | Suto | H05K 1/02 |
| 2018/0020936 | A1* | 1/2018 | Kwon | H01B 5/14 600/388 |
| 2019/0297676 | A1* | 9/2019 | Ito | B32B 5/12 |
| 2019/0297677 | A1* | 9/2019 | Ito | B32B 7/12 |
| 2019/0311937 | A1* | 10/2019 | Yokoi | C09J 7/245 |
| 2019/0358937 | A1 | 11/2019 | Shouhi et al. | |
| 2021/0185768 | A1* | 6/2021 | Ito | B32B 27/36 |
| 2021/0195693 | A1* | 6/2021 | Ito | H05B 3/267 |
| 2021/0337632 | A1 | 10/2021 | Ito et al. | |
| 2022/0064500 | A1* | 3/2022 | Morioka | B32B 15/085 |

FOREIGN PATENT DOCUMENTS

| | | | |
|---|---|---|---|
| CN | 109997410 | A | 7/2019 |
| CN | 110036459 | A | 7/2019 |
| DE | 1910026 | A1 | 1/1971 |
| FR | 1398531 | A | 5/1965 |
| JP | 2012-126635 | A | 7/2012 |
| WO | 2012/067194 | A1 | 5/2012 |
| WO | 2017/086395 | A1 | 5/2017 |
| WO | 2018/097323 | A1 | 5/2018 |
| WO | 2018/105613 | A1 | 6/2018 |
| WO | 2020/045550 | A1 | 3/2020 |
| WO | 2020/045677 | A1 | 3/2020 |

OTHER PUBLICATIONS

International Search Report issued in corresponding International Patent Application No. PCT/JP2021/017395 dated Jul. 13, 2021, with English translation.

English translation of the International Preliminary Report on Patentability issued in corresponding International Patent Application No. PCT/JP2021/017395, dated Nov. 8, 2022.

Extended European Search Report issued for the corresponding European patent application No. 21800559.3 on Oct. 2, 2024.

* cited by examiner

WIRING SHEET

CROSS REFERENCE TO RELATED APPLICATIONS

This patent application is the U.S. National Phase under 35 U.S.C. § 371 of International Application No. PCT/JP2021/017395, filed on May 6, 2021, which claims the benefit of Japanese Patent Application No. 2020-082584, dated May 8, 2020, the entire contents of each are hereby incorporated by reference in their entirety.

TECHNICAL FIELD

The present invention relates to a wiring sheet.

BACKGROUND ART

A sheet-shaped conductive member including a pseudo sheet structure in which conductive linear bodies are arranged at intervals (hereinafter occasionally also referred to as a "conductive sheet") may be used as a component of various articles (e.g. a heat-generating body of a heater, a material of heat-generating textiles, and a protection film (anti-shattering film) for a display device).

Patent Literature 1 discloses an example of a sheet usable for a heat-generating body in a form of a conductive sheet including a pseudo sheet structure in which a plurality of linear bodies extending unidirectionally are arranged at intervals. A pair of electrodes is provided at respective ends of the linear bodies to provide a wiring sheet usable as a heat-generating body.

CITATION LIST

Patent Literature(s)

Patent Literature 1: WO 2017/086395 A

SUMMARY OF THE INVENTION

Problem(s) to be Solved by the Invention

However, it is found out that the wiring sheet as described in Patent Literature 1 may have a high resistance value of wirings.

An object of the invention is to provide a wiring sheet in which a resistance value is not likely to increase.

Means for Solving the Problem(s)

A wiring sheet according to an aspect of the invention includes: a pseudo sheet structure including a plurality of conductive linear bodies arranged at intervals; a cured product layer supporting the pseudo sheet structure; and a pair of electrodes in direct contact with the conductive linear bodies, in which the cured product layer is formed from a cured product of a curable adhesive agent, and a storage modulus at 23 degrees C. of the cured product layer is in a range from $5.0\times10^{6}$ Pa to $1.0\times10^{10}$ Pa.

In the wiring sheet according to the aspect of the invention, the conductive linear bodies preferably include a metal wire.

In the wiring sheet according to the aspect of the invention, the metal wire is preferably formed from a single species of metal.

In the wiring sheet according to the aspect of the invention, the electrodes are preferably metallic foil having a thickness of 40 μm or less or a metal wire.

In the wiring sheet according to the aspect of the invention, a thickness of the cured product layer is preferably smaller than a diameter of the conductive linear bodies.

In the wiring sheet according to the aspect of the invention, the cured product layer preferably contains no filler.

The wiring sheet according to the aspect of the invention preferably further includes a base material on a side of the cured product layer on which the electrodes are not provided.

According to the aspect of the invention, a wiring sheet in which a resistance value is not likely to vary can be provided.

DESCRIPTION OF EMBODIMENT(S)

Exemplary embodiment(s) of the invention will be described below with reference to the attached drawings. The scope of the invention is not limited to the disclosures of the exemplary embodiment(s). It should be noted that some parts of the drawings are enlarged or reduced in size for the convenience of description.

Wiring Sheet

Figure 1:
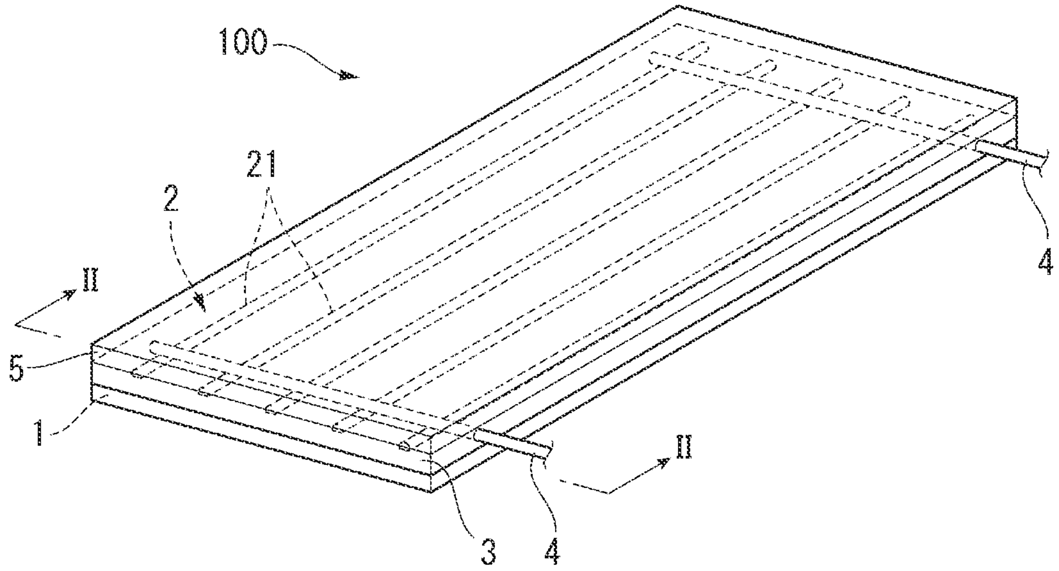
FIG. 1 is a schematic view of a wiring sheet according to an exemplary embodiment of the invention.
Figure 2:
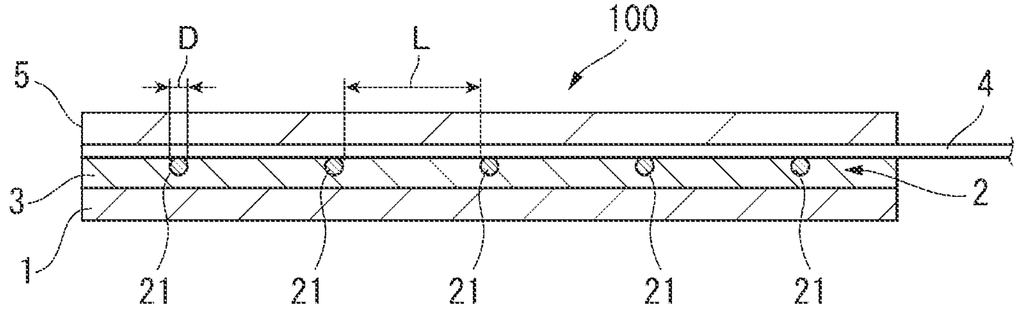
FIG. 2 is a cross sectional view taken along a line II-II in FIG. 1.

As shown in FIGS. 1 and 2, a wiring sheet 100 according to an exemplary embodiment includes a first base material 1, a pseudo sheet structure 2, a cured product layer 3, a pair of electrodes 4, and a second base material 5, Specifically, in the wiring sheet 100, the cured product layer 3 is laminated on the first base material 1 to support the pseudo sheet structure 2. That is, in the wiring sheet 100 according to the exemplary embodiment, the first base material 1, the cured product layer 3, the pseudo sheet structure 2, the electrodes 4, and the second base material 5 are provided in this order. One of the electrodes 4 is in direct contact with conductive linear bodies 21 in the pseudo sheet structure 2. Further, the second base material 5 is laminated on a side of the cured product layer 3 on which the electrodes 4 are provided.

First Base Material

Examples of the first base material 1 include a synthetic resin film, paper, metallic foil, and a glass film. The first base material 1 is provided on a side of the cured product layer 3 on which the electrodes 4 are not provided. The first base material 1 protects the pseudo sheet structure 2. Providing the first base material further inhibits contact portions between the conductive linear bodies 21 and the electrodes 4 from deforming in a thickness direction inside the wiring sheet 100, resulting in a stable contact between the conductive linear bodies 21 and the electrodes 4. Thus, the first base material 1 is preferably a high rigidity material such as a synthetic resin film, metallic foil, or a glass film. More preferably, the first base material 1 is a synthetic resin film in view of handleability.

Further, the first base material 1 is preferably energy-ray transmissive. When using such an energy-ray-transmissive first base material 1, energy ray may be radiated from a side on which the first base material 1 is provided, curing an energy-ray-curable adhesive agent.

Examples of the synthetic resin film include a polyethylene film, polypropylene film, polybutene film, polybutadiene film, polymethylpentene film, polyvinyl chloride film, vinyl chloride copolymer film, polyethylene terephthalate film, polyethylene naphthalate film, polybutylene terephthalate film, polyurethane film, ethylene vinyl acetate copolymer film, ionomer resin film, ethylene-(meth)acrylate copolymer film, ethylene-(meth)acrylate ester copolymer film, polystyrene film, polycarbonate film, polyetheretherketone film, polyphenylenesulfide film, polyvinylidene fluoride film, polytetrafluoroethylene film, silicone film, and polyimide film. Among the above, in view of heat resistance required when the wiring sheet is used as a heat-generating body, a polymethylpentene film, polyethylene naphthalate film, polyetheretherketone film, polyphenylenesulfide film, polyvinylidene fluoride film, polytetrafluoroethylene film, silicone film, and polyimide film are preferable. In view of availability, a price, and ease of adhesive bonding, a polyethylene naphthalate film and a polyimide film are preferable, and a polyimide film is more preferable.

Examples of the paper include high-quality paper, recycled paper, and craft paper.

Pseudo Sheet Structure

The pseudo sheet structure 2 is a structure in which the conductive linear bodies 21, each of which is in the form of a line, are arranged at intervals to have a surface shape as a whole. The surface shape may be a flat surface or a curved surface. In the wiring sheet 100 with flexibility, the pseudo sheet structure 2 may have a curved surface shape by being bent or a flat surface shape by being stretched. The conductive linear bodies 21 are linear-shaped in a plan view of the wiring sheet 100. In the pseudo sheet structure 2, the conductive linear bodies 21 are arranged in a direction orthogonal to an axial direction of the conductive linear bodies 21.

The conductive linear bodies 21 may be in a form of waves in a plan view of the wiring sheet 100. Specific examples of the wave-shape of the conductive linear bodies 21 include a sine wave, rectangular wave, triangular wave, and saw-tooth wave. The pseudo sheet structure 2 configured as above makes it easy to stretch the wiring sheet 100 in the axial direction of the conductive linear bodies 21, and makes it possible to inhibit the breakage of the conductive linear bodies 21 when the wiring sheet 100 is stretched.

The volume resistivity of the conductive linear bodies 21 is preferably in a range from $1.0\times10^{-9}$ Ω·m to $1.0\times10^{-3}$ Ω·m, more preferably in a range from $1.0\times10^{-8}$ Ω·m to $1.0\times10^{-4}$ Ω·m. When the volume resistivity of the conductive linear bodies 21 falls within the above range, the sheet resistance of the pseudo sheet structure 2 easily decreases.

The volume resistivity of the conductive linear bodies 21 is measured as follows. A silver paste is applied to both ends of the conductive linear bodies 21 and the resistance at a part having a length of 40 mm between the both ends is measured to determine a resistance value of the conductive linear bodies 21. Then, a value, which is obtained by multiplying a cross-sectional area (unit: $m^2$) of the conductive linear bodies 21 by the above resistance value, is divided by the above length (0.04 m) to calculate a volume resistivity of the conductive linear bodies 21. Further, the volume resistivity can be measured by taking the conductive linear bodies 21 out of the wiring sheet 100, as needed.

The cross-sectional shape of the conductive linear bodies 21, which is not specifically limited, may be polygonal, flattened, elliptical, circular, or the like. An elliptical shape or a circular shape is preferable in view of compatibility with an adhesive agent.

When the cross-sectional shape of the conductive linear bodies 21 is circular, the conductive linear bodies 21 preferably have a thickness (diameter) D (see FIG. 2) in a range from 5 μm to 75 μm. In order to restrain an increase in sheet resistance and improve heating efficiency and anti-insulation/breakage properties when the wiring sheet 100 is used as a heat-generating body, the diameter D of the conductive linear bodies 21 is more preferably in a range from 8 μm to 60 μm, further preferably in a range from 12 μm to 40 μm.

When the cross section of the conductive linear bodies 21 is elliptical, the major axis thereof is preferably in the same range as the diameter D described above.

The diameter D of the conductive linear bodies 21 is an average of diameters at randomly selected five points of the conductive linear bodies 21 of the pseudo sheet structure 2 measured through observation with a digital microscope.

An interval L (see FIG. 2) between the conductive linear bodies 21 is preferably in a range from 0.3 mm to 20 mm, more preferably in a range from 0.5 mm to 10 mm, and further preferably in a range from 0.8 mm to 7 mm.

When the interval between the conductive linear bodies 21 falls within the above range, the conductive linear bodies are densely arrayed to some extent. This can enhance the performance of the wiring sheet 100 such as keeping the resistance of the pseudo sheet structure at a low level and providing uniform distribution in temperature rise when the wiring sheet 100 is used as a heat-generating body.

The interval L between the conductive linear bodies 21 is obtained by measuring an interval between two adjacent conductive linear bodies 21 of the pseudo sheet structure 2 through observation with a digital microscope.

It should be noted that the interval between two adjacent conductive linear bodies 21 herein refers to a length between facing parts of the two conductive linear bodies 21 in an arraying direction of the conductive linear bodies 21 (see FIG. 2). When the conductive linear bodies 21 are arrayed at uneven intervals, the interval L is an average of the intervals between all of the pairs of the conductive linear bodies 21 adjacent to each other.

The conductive linear bodies 21, which are not specifically limited, are preferably linear bodies including a metal wire (hereinafter also referred to as "metal wire linear bodies"). The metal wire is excellent in electric conductivity, handleability, heat conductivity, and versatility. Using the metal wire linear bodies as the conductive linear bodies 21 thus reduces the resistance value of the pseudo sheet structure 2. Further, when the wiring sheet 100 (pseudo sheet structure 2) is used as a heat-generating body, heat is easily and quickly generated. Furthermore, small-diameter linear bodies as described above are easily obtainable.

It should be noted that examples of the conductive linear body 21 include, in addition to the metal wire linear body, a linear body including a carbon nanotube and a linear body in a form of a conductively coated yarn.

The metal wire linear body may be a linear body made of a single metal wire or a linear body provided by spinning a plurality of metal wires.

Examples of the metal wire include wires containing metals, such as copper, aluminum, tungsten, iron, molybdenum, nickel, titanium, silver, and gold, or alloys containing two or more metals (e.g., steels such as stainless steel and carbon steel, brass, phosphor bronze, zirconium-copper alloy, beryllium copper, iron nickel, Nichrome®, nickel titanium, KANTHAL®, HASTELLOY®, and rhenium tungsten). The metal wire may be plated with tin, zinc, silver, nickel, chromium, nickel-chromium alloy, solder, or the like. The surface of the metal wire may be coated with a later-described carbon material or a polymer. Especially, a wire containing one or more metals selected from among tungsten, molybdenum and alloys containing tungsten and molybdenum is preferable in terms of providing the conductive linear bodies 21 with a low volume resistivity.

The metal wire may be coated with a carbon material. Coating the metal wire with a carbon material reduces metallic luster, making it easy for the metal wire to be less noticeable. Further, the metal wire coated with a carbon material is restrained from metal corrosion.

Examples of the carbon material usable for coating the metal wire include amorphous carbon (e.g. carbon black, active carbon, hard carbon, soft carbon, mesoporous carbon, and carbon fiber), graphite, fullerene, graphene, and a carbon nanotube.

In the exemplary embodiment, the metal wire is preferably formed from a single species of metal because a process such as a plating process can be omitted. In the exemplary embodiment, the contact between the conductive linear bodies 21 and the electrodes 4 is stabilized, restraining an increase in resistance value. Thus, even when a metal wire formed from a single species of metal is used instead of a metal wire plated with metal excellent in contact resistance, the contact resistance between the conductive linear bodies 21 and the electrodes 4 can be stabilized. The metal wire formed from a single species of metal means not only that a surface of the metal wire is not coated with a different species of metal by plating or the like, but also that the surface of the metal wire is not coated with any material (e.g., carbon material and polymer) other than the single species of metal.

The carbon nanotube linear body is obtained by, for instance, drawing, from an end of a carbon nanotube forest (which is a grown form provided by causing a plurality of carbon nanotubes to grow on a substrate, the carbon nanotubes being oriented in a vertical direction relative to the substrate, and which is also referred to as "array"), the carbon nanotubes into a sheet form, bundling the drawn carbon nanotube sheets, and spinning a bundle of the carbon nanotubes. When the carbon nanotubes are not spun, a ribbon-shaped carbon nanotube linear body is obtained. When the carbon nanotubes are spun, a yarn-shaped linear body is obtained. The ribbon-shaped carbon nanotube linear body is a linear body without a structure in which the carbon nanotubes are twisted. Alternatively, the carbon nanotube linear body can be obtained by performing, for instance, spinning from a dispersion liquid of carbon nanotubes. The production of the carbon nanotube linear body by spinning can be performed by, for instance, a method disclosed in U.S. Patent Application Publication No. 2013/0251619 (JP 2012-126635 A). The use of the yarn-shaped carbon nanotube linear bodies is preferable in order to obtain carbon nanotube linear bodies having a uniform diameter. The yarn-shaped carbon nanotube linear bodies are preferably produced by spinning the carbon nanotube sheets in order to obtain carbon nanotube linear bodies with high purity. The carbon nanotube linear body may be a linear body provided by knitting two or more carbon nanotube linear bodies. Alternatively, the carbon nanotube linear body may be a linear body provided by combining a carbon nanotube and another conductive material (hereinafter, also referred to as "composite linear body").

Examples of the composite linear body include: (1) a composite linear body obtained by depositing an elemental metal or metal alloy on a surface of carbon nanotube forest, carbon nanotube sheet, or bundle of the carbon nanotube or on a surface of the spun linear body through vapor deposition, ion plating, sputtering or wet plating in the process of producing a carbon nanotube linear body obtained by drawing carbon nanotubes from an end of the carbon nanotube forest to form the sheets, bundling the drawn carbon nanotube sheets and then spinning the bundle of the carbon nanotubes; (2) a composite linear body in which a bundle of carbon nanotubes is spun with a linear body of an elemental metal or a linear body or composite linear body of a metal alloy; and (3) a composite linear body in which a carbon nanotube linear body or a composite linear body is woven with a linear body of an elemental metal or a linear body or composite linear body of a metal alloy. In the composite linear body of (2), metal may be supported on the carbon nanotubes when spinning the bundle of the carbon nanotubes as in the composite linear body of (1). Further, although the composite linear body of (3) is a composite linear body provided by weaving two linear bodies, the composite linear body of (3) may be provided by weaving three or more carbon nanotube linear bodies, linear bodies of an elemental metal, or linear bodies or composite linear bodies of a metal alloy, as long as at least one linear body of an elemental metal, or a linear body or composite linear body of a metal alloy is contained.

Examples of the metal for the composite linear body include elemental metals such as gold, silver, copper, iron, aluminum, nickel, chrome, tin, and zinc and alloys containing at least one of these elemental metals (a copper-nickel-phosphorus alloy, a copper-iron-phosphorus-zinc alloy, etc.).

The conductive linear body 21 may be a linear body in a form of a conductive-coated yarn. Examples of the yarn include yarns made from resins, such as nylon and polyester, by spinning. Examples of the conductive coating include coating films of a metal, a conductive polymer, a carbon material, and the like. The conductive coating can be formed by plating, vapor deposition, or the like. The linear body including the conductive-coated yarn can be improved in conductivity of the linear body with flexibility of the yarn maintained, making it possible to easily reduce the resistance of the pseudo sheet structure 2.

Cured Product Layer

The cured product layer 3 is a layer formed from a cured product of a curable adhesive agent. When the wiring sheet 100 according to the exemplary embodiment includes the first base material, the cured product layer 3 is preferably provided between the first base material 1 and the pseudo sheet structure 2 as shown in FIGS. 1 and 2. The cured product layer 3 allows the pseudo sheet structure 2 to be fixed with the surface shape of the pseudo sheet structure 2 maintained. That is, the pseudo sheet structure 2 is supported by the cured product layer 3. Further, the electrodes 4 and the second base material 5 can be fixed by bonding at least one of the electrodes 4 or the second base material 5 to parts of a surface of the cured product layer 3 that are not in contact with the respective conductive linear bodies 21 of the pseudo sheet structure 2, When the wiring sheet 100 includes an adhesive agent layer that is not curable instead of the cured product layer 3, an increase in resistance value may occur. This is because the conductive linear bodies 21 may move due to deformation in the thickness direction inside the wiring sheet 100 and the contact between the conductive linear bodies 21 and the electrodes 4 may be lost. In such a case, contact pressure needs to be applied to the conductive linear bodies 21 and the electrodes 4 for the purpose of maintaining the contact between the conductive linear bodies 21 and the electrodes 4. On the other hand, the cured product layer 3 as described in the exemplary embodiment allows the conductive linear bodies 21 to be fixed, stabilizing the contact between the conductive linear bodies 21 and the electrodes 4. An increase in resistance value is thus inhibited.

The storage modulus at 23 degrees C. of the cured product layer 3 needs to be in a range from $5.0\times10^{6}$ Pa to $1.0\times10^{10}$ Pa. When the storage modulus is less than $5.0\times10^{6}$ Pa, the pressure applied to the conductive linear bodies 21 is too low. Thus, application of contact pressure is required to inhibit an increase in resistance value. When the storage modulus exceeds $1.0\times10^{10}$ Pa, the cured product layer 3 is too hard. Such a cured product layer 3 may damage connection portions between the conductive linear bodies 21 and the electrodes 4 upon deformation of the wiring sheet 100 after production, leading to an increase in resistance value and a situation where the wiring sheet 100 cannot be energized.

In view of the above, the storage modulus at 23 degrees C. of the cured product layer 3 is preferably in a range from $0.8\times10^{7}$ Pa to $8.0\times10^{9}$ Pa, and more preferably in a range from $1.0\times10^{7}$ Pa to $5.0\times10^{9}$ Pa.

The thickness of the cured product layer 3 is preferably smaller than the diameter D of the conductive linear bodies 21. When the thickness of the cured product layer 3 is smaller than the diameter D of the conductive linear bodies 21, an adhesive agent is not likely to penetrate between the conductive linear bodies 21 and the electrodes 4, stabilizing the contact resistance between the conductive linear bodies 21 and the electrodes 4. The thickness of the cured product layer 3 is preferably less than or equal to 0.95 times, more preferably less than or equal to 0.9 times, of the diameter D of the conductive linear bodies 21. Specifically, the thickness of the cured product layer 3 is preferably 5 μm or more and less than 75 μm, more preferably 8 μm or more and less than 60 μm, and further preferably 12 μm or more and less than 40 μm.

Examples of the curable adhesive agent include a thermosetting adhesive agent curable by heat and an energy-ray-curable adhesive agent. Examples of the energy ray include an ultraviolet ray, visible energy ray, infrared ray, and electron ray. It should be noted that "curing with an energy ray" includes thermosetting by energy-ray heating.

The thermosetting adhesive agent preferably contains a thermosetting resin. The thermosetting resin, which is not practically limited, is specifically exemplified by an epoxy resin, phenol resin, melamine resin, urea resin, polyester resin, urethane resin, acrylic resin, benzoxazine resin, phenoxy resin, amine compound, and acid anhydride compound. One of the thermosetting resins may be used alone, or two or more thereof may be used in combination. Among the above examples, in terms of suitability for curing with an imidazole curing catalyst, it is preferable to use an epoxy resin, phenol resin, melamine resin, urea resin, amine compound, and acid anhydride compound. Particularly, in terms of exhibiting excellent curability, it is preferable to use an epoxy resin, phenol resin, mixture thereof, or a mixture of an epoxy resin and at least one selected from the group consisting of a phenol resin, melamine resin, urea resin, amine compound, and acid anhydride compound. It is preferable to use an epoxy resin.

As the epoxy resin, a cyclic epoxy resin such as an aromatic epoxy resin or alicyclic epoxy resin is preferably used to improve the storage modulus of the cured product layer. An epoxy resin having a flexible segment (e.g., an oxyalkylene chain) tends to decrease the storage modulus of the cured product layer.

The energy-ray-curable adhesive agent preferably contains an energy-ray-curable resin. The energy-ray-curable resin is exemplified by a compound having at least one polymerizable double bond in a molecule, preferably an acrylate compound having a (meth)acryloyl group.

Examples of the acrylate compound include: chain aliphatic skeleton-containing (meth)acrylates (e.g., dicyclopentadiene diacrylate, trimethylolpropane tri(meth)acrylate, tetramethylolmethane tetra(meth)acrylate, pentaerythritol tri(meth)acrylate, pentaerythritol tetra(meth)acrylate, dipentaerythritol monohydroxy penta(meth)acrylate, dipentaerythritol hexa(meth)acrylate, 1,4-butyleneglycol di(meth)acrylate, and 1,6-hexanediol di(meth)acrylate); cyclic aliphatic skeleton-containing (meth)acrylates (e.g., dicyclopentanyl di(meth)acrylate); polyalkyleneglycol (meth)acrylates (e.g., polyethyleneglycol di(meth)acrylate);

oligoester (meth)acrylate; urethane (meth)acrylate oligomer; epoxy-modified (meth)acrylate; polyether (meth)acrylates other than the above polyalkyleneglycol (meth)acrylates; and itaconic add oligomer.

A weight average molecular weight (Mw) of the energy-ray-curable resin is preferably in a range from 100 to 30,000, more preferably in a range from 300 to 10,000.

The adhesive agent may contain only one kind or two or more kinds of the energy-ray-curable resins. In a case of two or more kinds of the energy-ray-curable resins, a combination and ratio thereof are selectable as needed.

When the energy-ray-curable resin or the thermosetting resin is used, a photopolymerization initiator, thermal polymerization initiator, or the like is preferably used. The use of the photopolymerization initiator, thermal polymerization initiator, or the like facilitates the start of polymerization reaction of the curable resin, making the control for curing reaction easy.

Examples of the photopolymerization initiator include a photoradical polymerization initiator such as benzophenone, acetophenone, benzoin, benzoinmethylether, benzoinethylether, benzoinisopropylether, benzoinisobutylether, benzoin benzoic acid, benzoin methyl benzoate, benzoin dimethylketal, 2,4-diethylthioxanthone, 1-hydroxycyclohexylphenylketone, benzyldiphenylsulfide, tetramethylthiuram monosulfide, azobisisobutyronitrile, 2-chloroanthraquinone, diphenyl(2,4,6-trimethylbenzoyl)phosphine oxide, and bis(2,4,6-trimethylbenzoyl)-phenyl-phosphine oxide.

In addition to the photoradical polymerization initiator, the photopolymerization initiator is exemplified by a cationic photopolymerization initiator. The cationic photopolymerization initiator is a compound that generates cationic species upon active energy ray radiation to start curing reaction of a cationic curable compound, which includes a cationic moiety that absorbs active energy ray and an anionic moiety that acts as an acid source.

Examples of the cationic photopolymerization initiator include a sulfonium salt compound, iodonium salt compound, phosphonium salt compound, ammonium salt compound, antimonic acid salt compound, diazonium salt compound, selenium salt compound, oxonium salt compound, and bromine salt compound. Among the above, a sulfonium salt compound is preferably used because (A) compatibility with components is excellent and good preservation stability is provided in the adhesive agent to be obtained. An aromatic sulfonium salt compound having an aromatic group is more preferably used for the same reasons.

Examples of the sulfonium salt compound include triphenylsulfonium hexafluorophosphate, triphenylsulfonium hexafluoroantimonate, triphenylsulfonium tetrakis(pentafluorophenyl)borate, 4,4'-bis[diphenylsulfonio]diphenylsulfide-bishexafluorophosphate, 4,4'-bis[di(β-hydroxyethoxy)phenylsulfonio]diphenylsulfide-bishexafluoroantimonate, 7-[di(p-toluyl)sulfonio]-2-isopropyl thioxanthone hexafluorophosphate, 7-[di(p-toluyl)sulfonio]-2-isopropyl thioxanthone hexafluoroantimonate, 7-[di(p-toluyl)sulfonio]-2-isopropyl tetrakis(pentafluorophenyl)borate, phenylcarbonyl-4'-diphenylsulfonio-diphenylsulfide-hexafluorophosphate, phenylcarbonyl-4'-diphenylsulfonio-diphenylsulfide-hexafluoroantimonate, 4-tert-butylphenylcarbonyl-4'-diphenylsulfonio-diphenylsulfide-hexafluorophosphate, 4-tert-butylphenylcarbonyl-4'-diphenylsulfonio-diphenylsulfide-hexafluoroantimonate, 4-tert-butylphenylcarbonyl-4'-diphenylsulfonio-diphenylsulfide-tetrakis(pentafluorophenyl)borate, thiophenyl diphenyl sulfonium hexafluoroantimonate, thiophenyl diphenyl sulfonium hexafluorophosphate, 4-{4-(2-chlorobenzoyl)phenylthio}phenylbis(4-fluorophenyl)sulfonium hexafluoroantimonate, a halide of thiophenyl diphenyl sulfonium hexafluoroantimonate, 4,4',4"-tri(β-hydroxyethoxyphenyl)sulfonium hexafluoroantimonate, 4,4'-bis[diphenylsulfonio]diphenylsulfide-bishexafluoroantimonate, diphenyl[4-(phenylthio)phenyl]sulfonium trifluorotrispentafluoro ethylphosphate, and tris[4-(4-acetylphenylsulfanyl)phenyl]sulfonium tris[(trifluoromethyl)sulfonyl]metanide.

Examples of the iodonium salt compound include diphenyliodonium tetrakis(pentafluorophenyl)borate, diphenyliodonium hexafluorophosphate, diphenyliodonium hexafluoroantimonate, di(4-nonylphenyl)iodonium hexafluorophosphate, and (tricumypiodonium tetrakis(pentafluorophenyl)borate.

Examples of the phosphonium salt compound include tri-n-butyl(2,5-dihydroxyphenyl)phosphonium bromide and hexadecyltributylphosphonium chloride.

Examples of the ammonium salt compound include benzyltrimethylammonium chloride, phenyltributylammonium chloride, and benzyltrimethylammonium bromide.

Examples of the antimonic acid salt compound include triphenylsulfonium hexafluoroantimonate, p-(phenylthio)phenyl diphenyl sulfonium hexafluoroantimonate, 4-chlorophenyl diphenyl sulfonium hexafluoroantimonate, bis[4-(diphenylsulfonio)phenyl]sulfide bishexafluoroantimonate, and diallyl iodonium hexafluoroantimonate.

The cationic photopolymerization initiator may be a commercially available product. Examples of the commercially available product include CYRACURE UVI-6970, CYRACURE UVI-6974, CYRACURE UVI-6990, CYRACURE UVI-950 (all of the above produced by Union Carbide Corporation), IRGACURE 250, IRGACURE 261, IRGACURE 264 (all of the above produced by Ciba Specialty Chemicals Inc.), SP-150, SP-151, SP-170, OPTOMER SP-171 (all of the above produced by ADEKA CORPORATION), CG-24-61 (produced by Ciba Specialty Chemicals Inc.), DAICAT II (produced by Daicel Corporation), UVAC1590, UVAC1591 (all of the above produced by Daicel-Cytec Co., Ltd.), CI-2064, CI-2639, CI-2624, CI-2481, CI-2734, CI-2855, CI-2823, CI-2758, CIT-1682 (all of the above produced by NIPPON SODA CO., LTD.), PI-2074 (produced by Rhodia Japan Ltd.), FFC509 (produced by 3M), BBI-102, BBI-101, BBI-103, MPI-103, TPS-103, MDS-103, DTS-103, NAT-103, NDS-103 (all of the above produced by Midori Kagaku Co., Ltd.), CD-1010, CD-1011, CD-1012 (produced by Sartomer), and CPI-100P, CPI-101A, CPI-200K, CPI-310B (all of the above produced by San-Apro Ltd.).

The thermal polymerization initiator is exemplified by a thermal radical polymerization initiator such as hydrogen peroxide, peroxodisulfuric acid salts (e.g., ammonium peroxodisulfate, sodium peroxodisulfate, and potassium peroxodisulfate), azo compounds (e.g., 2,2'-azobis(2-amidinopropane)dihydrochloride, 4,4'-azobis(4-cyanovaleric acid), 2,2'-azobisisobutyronitrile, and 2,2'-azobis(4-methoxy-2,4-dimethylvaleronitrile)), and organic peroxides (e.g., benzoyl peroxide, lauroyl peroxide, peracetic acid, persuccinic acid, di-t-butyl peroxide, t-butyl hydroperoxide, and cumene hydroperoxide).

In addition to the thermal radical polymerization initiator, the thermal polymerization initiator is exemplified by a cationic thermal polymerization initiator. The cationic thermal polymerization initiator is a compound that may generate cationic species to start polymerization by heating. Examples of the cationic thermal polymerization initiator include a sulfonium salt, quaternary ammonium salt, phosphonium salt, diazonium salt, and iodonium salt. Among the above, a sulfonium salt is preferably used because availability is good and a sealing material excellent in adhesiveness and transparency is easy to obtain.

Examples of the sulfonium salt include triphenylsulfonium tetrafluoroborate, triphenylsulfonium hexafluoroantimonate, triphenylsulfonium hexafluoroarsenate, tris(4-methoxyphenyl)sulfonium hexafluoroarsenate, and diphenyl(4-phenylthiophenyl)sulfonium hexafluoroarsenate.

The sulfonium salt may be a commercially available product. Examples of the commercially available product include ADECAOPTON SP-150, ADECAOPTON SP-170, ADECAOPTON CP-66, ADECAOPTON CP-77 (all of the above produced by ADEKA CORPORATION), SAN-AID SI-60L, SAN-AID SI-80L, SAN-AID SI-100L, SAN-AID SI-B3, SAN-AID SI-B7 (all of the above produced by SANSHIN CHEMICAL INDUSTRY CO., LTD.), CYRACURE UVI-6974, CYRACURE UVI-6990 (all of the above produced by Union Carbide Corporation), UVI-508, UVI-509 (all of the above produced by General Electric Company), FC-508, FC-509 (all of the above produced by Minnesota Mining & Manufacturing Company), CD-1010, CD-1011 (all of the above produced by Sartomer), and CI product series (NIPPON SODA CO., LTD).

Specific examples of the quaternary ammonium salt include tetrabutylammonium tetrafluoroborate, tetrabutylammonium hexafluorophosphate, tetrabutylammonium hydrogen sulfate, tetraethylammonium tetrafluoroborate, tetraethylammonium p-toluenesulfonate, N,N-dimethyl-N-benzylanilinium hexafluoroantimonate, N,N-dimethyl-N-benzylanilinium tetrafluoroborate, N,N-dimethyl-N-benzylpyridinium hexafluoroantimonate, N,N-diethyl-N-benzyl trifluoromethanesulfate, N,N-dimethyl-N-(4-methoxybenzyl)pyridinium hexafluoroantimonate, and N,N-diethyl-N-

(4-methoxybenzyl)toluidinium hexafluoroantimonate. Examples of the phosphonium salt include ethyltriphenylphosphonium hexafluoroantimonate and tetrabutylphosphonium hexafluoroantimonate.

Examples of the diazonium salt include AMERICURE (produced by American Can Company) and ULTRASET (produced by ADEKA CORPORATION). Examples of the iodonium salt include diphenyliodonium hexafluoroarsenate, bis(4-chlorophenyl)iodonium hexafluoroarsenate, bis(4-bromophenyl)iodonium hexafluoroarsenate, and phenyl(4-methoxyphenyl)iodonium hexafluoroarsenate. The iodonium salt may be a commercially available product, which is exemplified by UV-9310C (produced by Toshiba Silicone Co., Ltd.), Photoinitiator 2074 (produced by Rhone Poulenc Ltd.), UVE product series (produced by General Electric Company), and FC product series (produced by Minnesota Mining & Manufacturing Company).

One of the polymerization initiators may be used alone, or two or more thereof may be used in combination.

When the polymerization initiator is used for forming a cross-linking structure, the content of the polymerization initiator is preferably in a range from 0.1 parts by mass to 100 parts by mass, more preferably in a range from 1 parts by mass to 100 parts by mass, and particularly preferably in a range from 1 parts by mass to 10 parts by mass, with respect to 100 parts by mass of the energy-ray-curable resin or the thermosetting resin.

The thermosetting resin may be a curing catalyst such as an imidazole curing catalyst.

In the exemplary embodiment, the adhesive agent may contain a polymer component together with an energy-ray-curable resin or thermosetting resin for the purpose of easily maintaining the sheet shape before curing. The polymer usable as the polymer component is exemplified by a phenoxy resin, polyolefin resin or modified polyolefin resin, polyimide-imide resin, polyimide resin, rubber-based resin, and acrylic resin. The use of the polymer component having a rigid skeleton such as a phenoxy resin or polyimide resin easily increases the storage modulus of the cured product layer.

One of the polymer components may be used alone, or two or more thereof may be used in combination.

When the adhesive agent according to the exemplary embodiment contains a polymer component, in order to adjust the storage modulus of the cured product layer to the above range, the total content of energy-ray-curable resin or thermosetting resin in the adhesive agent is preferably in a range from 15 parts by mass to 300 parts by mass, preferably in a range from 20 parts by mass to 200 parts by mass with respect to 100 parts by mass of the polymer component. When the adhesive agent contains the energy-ray-curable resin or thermosetting resin and no polymer component, the storage modulus of the cured product layer tends to be excessively high.

In the exemplary embodiment, the adhesive agent preferably contains no filler. When the adhesive agent contains no filler, the storage modulus at 23 degrees C. of the cured product layer 3 is inhibited from being too high.

However, the adhesive agent may contain a filler provided that the storage modulus at 23 degrees C. of the cured product layer 3 is adjustable in the above range.

Examples of the filler include inorganic powder (e.g., powders of silica, alumina, talc, calcium carbonate, titanium white, colcothar, silicon carbide, and boron nitride), beads of spheroidized inorganic powder, single crystal fiber, and glass fiber. Among the above, a silica filler and an alumina filler are preferable. One of the fillers may be used alone, or two or more thereof may be used in combination.

The adhesive agent may contain other components. Examples of other components include known additives such as an organic solvent, coupling agent, flame retardant, tackifier, ultraviolet absorber, antioxidant, preservative, antifungal agent, plasticizer, defoamer, and wettability modifier.

Electrodes

The electrodes 4 are used for supplying electric current to the conductive linear bodies 21. The electrodes 4 are in direct contact with the conductive linear bodies 21. The electrodes 4 are disposed at both ends of the conductive linear bodies 21 and electrically connected thereto.

The electrodes 4 are formable using a known electrode material. Examples of the electrode material include a conductive paste (e.g. silver paste), metallic foil (e.g. copper foil), and a metal wire. The electrodes 4 are preferably a metal wire or metallic foil, more preferably a metal wire or metallic foil having a thickness of 40 μm or less, because electrical connection with the conductive linear bodies 21 is easily achieved by contact pressure from the cured product layer 3. When a metal wire is used as the electrodes, both the electrodes and wiring from a power source are metallic lines, thus facilitating the connection therebetween. Further, thin metallic foil having a thickness of 40 μm or less is preferably used because the total thickness of the wiring sheet 100 and a level difference in electrode forming portions can be reduced. In the exemplary embodiment, the contact between the conductive linear bodies 21 and the electrodes 4 is stabilized, restraining an increase in resistance value. Thus, even when a metal wire or metallic foil having a thickness of 40 μm or less is used instead of a conductive paste excellent in contact resistance or thick metallic foil, the contact resistance between the conductive linear bodies 21 and the electrodes 4 can be stabilized. When the electrode material is a metal wire, the metal wire may be a single wire, preferably provided by two or more wires.

Examples of metal of the metallic foil or metal wire include metals such as copper, aluminum, tungsten, iron, molybdenum, nickel, titanium, silver, and gold and alloys containing two or more metals (e.g., steels such as stainless steel and carbon steel, brass, phosphor bronze, zirconium copper alloy, beryllium copper, iron nickel, Nichrome®, nickel titanium, KANTHAL®, HASTELLOY®, and rhenium tungsten). The metallic foil or metal wire may be plated with tin, zinc, silver, nickel, chromium, nickel-chromium alloy, solder, or the like. Especially, plating containing at least one metal selected from copper, silver, and an alloy containing copper and/or silver is preferable in view of metal having a low-volume-resistivity.

In a plan view of the pseudo sheet structure 2, the width of each electrode 4 is preferably 3,000 μm or less, more preferably 2,000 μm or less, and further preferably 1,500 μm or less. When two or more metal wires are used as the electrode, the width of the electrode 4 refers to a sum of the widths of the respective metal wires. A plurality of metal wires may be in direct contact with each other or electrically connected via the conductive linear bodies 21. When the electrode 4 is provided by a single metal wire, the width of the electrode 4 is a diameter of the metal wire.

A ratio in resistance value between the electrodes 4 and the pseudo sheet structure 2, which is obtained by a formula "a resistance value of the electrodes 4/a resistance value of the pseudo sheet structure 2", is preferably in a range from 0.0001 to 0.3, more preferably in a range from 0.0005 to 0.1, When the wiring sheet 100 is used as a heat-generating body, the pseudo sheet structure 2 to be heated needs to have resistance to some extent. On the other hand, preferably, electric current easily flows in the electrodes 4 as much as possible. This causes a difference in resistance value between the electrodes 4 and the pseudo sheet structure 2. For the above reason, temperature unevenness is more likely to occur as the ratio in resistance value between the electrodes 4 and the pseudo sheet structure 2 is larger.

The resistance values of the electrodes 4 and the pseudo sheet structure 2 can be measured using a tester. First, the resistance value of the electrodes 4 is measured and the resistance value of the pseudo sheet structure 2 attached with the electrodes 4 is measured. Subsequently, the respective resistance values of the electrodes 4 and the pseudo sheet structure 2 are calculated by subtracting the measurement value of the electrodes 4 from the resistance value of the pseudo sheet structure 2 attached with the electrodes. Further, the resistance values can be measured by taking the electrodes 4 out of the wiring sheet 100, as needed.

Second Base Material

Examples of the second base material 5 are similar to those of the first base material 1. The second base material 5 is provided on a side of the cured product layer 3 on which the electrodes 4 are provided. The second base material 5 protects the pseudo sheet structure 2. Interposing the pseudo sheet structure 2 and the electrodes 4 between the first base material 1 and the second base material 5 further inhibits the contact portions between the conductive linear bodies 21 and the electrodes 4 from deforming in the thickness direction inside the wiring sheet 100, resulting in a further stable contact between the conductive linear bodies 21 and the electrodes 4.

Further, the second base material 5 is preferably energy-ray transmissive. When using such an energy-ray-transmissive second base material 5, energy ray may be radiated from a side on which the second base material 5 is provided, curing an energy-ray-curable adhesive agent.

Method for Producing Wiring Sheet

A method for producing the wiring sheet 100 according to the exemplary embodiment is not specifically limited. The wiring sheet 100 can be produced, for instance, by a process described below.

Figure 3A:
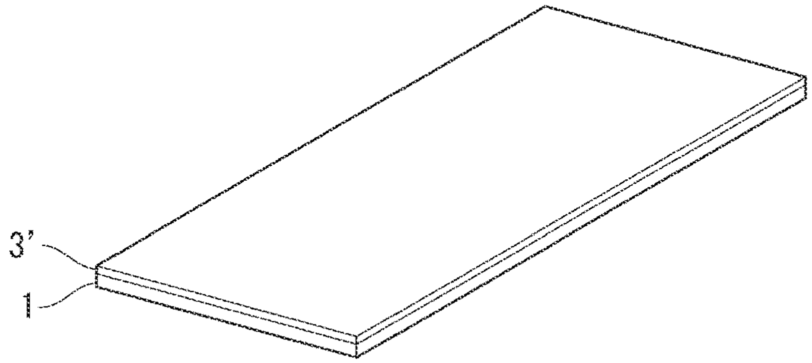
FIG. 3A is an illustration for explaining a method for producing the wiring sheet according to the exemplary embodiment of the invention.
Figure 3B:
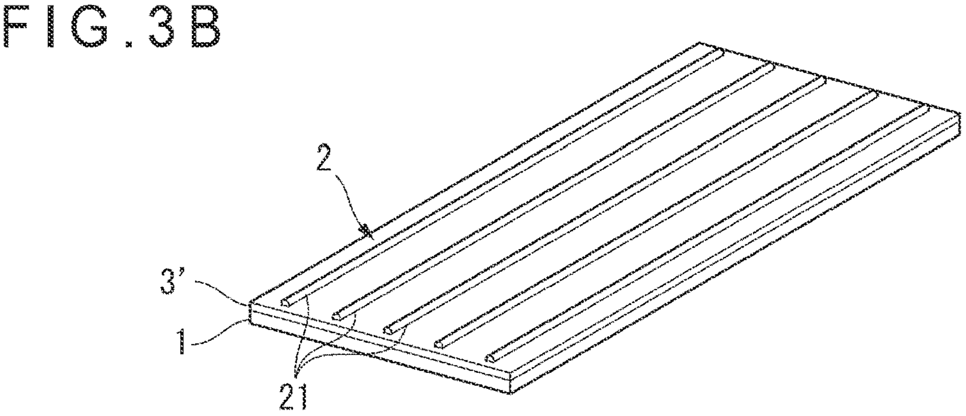
FIG. 3B is another illustration for explaining the method for producing the wiring sheet according to the exemplary embodiment of the invention.

First, as shown in FIG. 3A, the first base material 1 is coated with a thermosetting adhesive agent for forming the cured product layer 3 to form a coating film. Subsequently, the coating film is dried to form an adhesive agent layer 3'. Then, as shown in FIG. 3B, the conductive linear bodies 21 are arrayed on the adhesive agent layer 3' to form the pseudo sheet structure 2. For instance, a drum member is rotated in a state where the adhesive agent layer 3' attached with the first base material 1 is disposed on an outer circumferential surface of the drum member, and the conductive linear bodies 21 are spirally wound on the adhesive agent layer 3' during the rotation of the drum member. After that, a bundle of the conductive linear bodies 21 spirally wound is cut along an axial direction of the drum member, resulting in the pseudo sheet structure 2 disposed on the adhesive agent layer 3'. Accordingly, a sheet-shaped member, in which the pseudo sheet structure 2 is formed on the adhesive agent layer 3' attached with the first base material 1, is obtained. In this method, the interval L between adjacent ones of the conductive linear bodies 21 of the pseudo sheet structure 2 is easily adjusted by, for instance, moving a feeder of the conductive linear bodies 21 along a direction parallel to the axis of the drum member while turning the drum member.

Figure 3C:
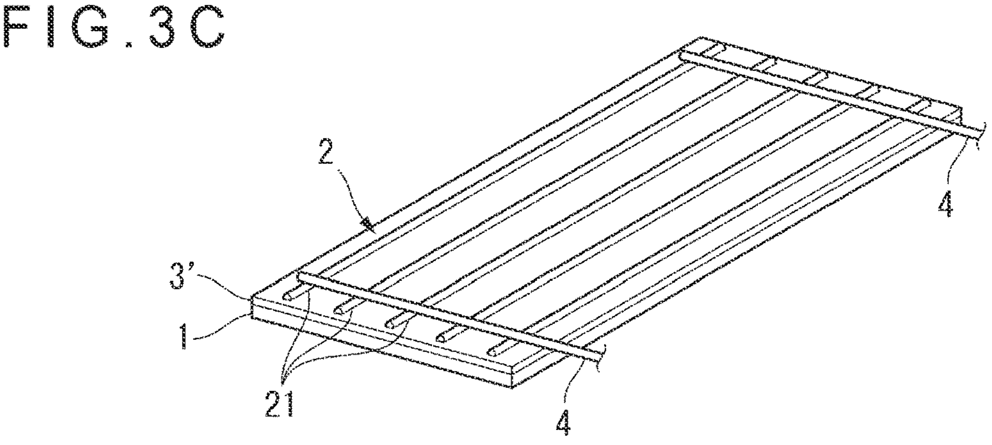
FIG. 3C is still another illustration for explaining the method for producing the wiring sheet according to the exemplary embodiment of the invention.
Figure 3D:
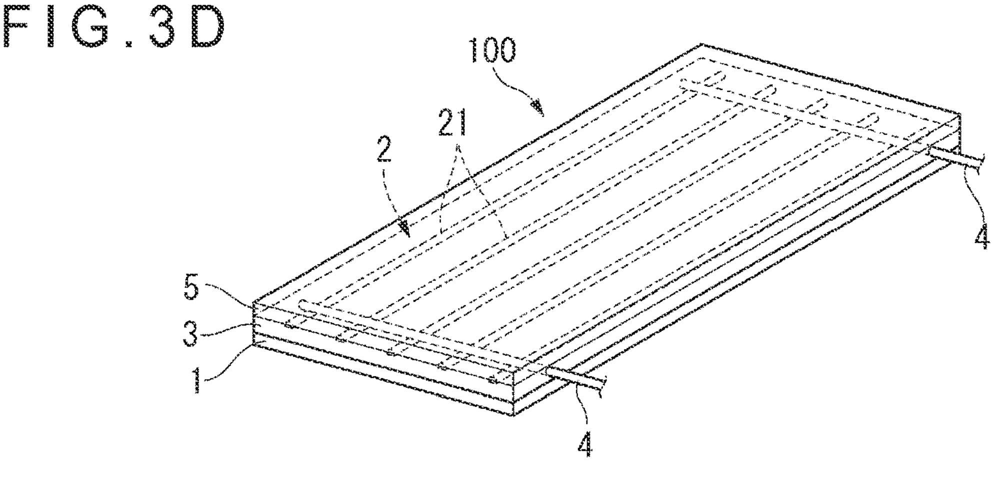
FIG. 3D is a further illustration for explaining the method for producing the wiring sheet according to the exemplary embodiment of the invention.

Next, as shown in FIG. 30, the electrodes 4 are attached to respective ends of the conductive linear bodies 21 of the pseudo sheet structure 2 of the sheet-shaped member. Then, as shown in FIG. 3D, the second base material 5 is laminated thereon, and the cured product layer 3 is formed by curing the curable adhesive agent by heating. The wiring sheet 100 is thus produced.

Working and Effect of Exemplary Embodiment

The following working and effect can be achieved by the exemplary embodiment.

(1) According to the exemplary embodiment, the cured product layer 3 allows the conductive linear bodies 21 to be fixed, inhibiting deformation in the thickness direction inside the wiring sheet 100 and stabilizing the contact between the conductive linear bodies 21 and the electrodes 4. An increase in resistance value is thus inhibited.

(2) According to the exemplary embodiment, adjusting the storage modulus at 23 degrees C. of the cured product layer 3 in a range from $5.0\times10^{6}$ Pa to $1.0\times10^{10}$ Pa allows the conductive linear bodies 21 to be fixed while inhibiting a damage on the connection portions between the conductive linear bodies 21 and the electrodes 4 upon deformation of the wiring sheet 100.

Modifications of Exemplary Embodiment

The scope of the invention is not limited to the above exemplary embodiment, and modifications, improvements, etc. are included within the scope of the invention as long as they are compatible with an object of the invention, For instance, the wiring sheet 100 includes the second base material 5 in the above exemplary embodiment. The invention is not limited thereto. For instance, the wiring sheet 100 may not include the second base material 5. That is, in the wiring sheet 100 according to the exemplary embodiment, the first base material 1, the cured product layer 3, the pseudo sheet structure 2, and the pair of electrodes 4 are provided in this order. The wiring sheet 100 according to the exemplary embodiment is usable by attaching the wiring sheet 100 to an adherend through the adhesive agent layer 3' and then curing the curable adhesive agent to form the cured product layer 3. In this case, an adherend formed from a material having high rigidity easily stabilizes the contact between the conductive linear bodies 21 and the electrodes 4. Examples of the material having high rigidity include metal, resin, and glass.

Alternatively, the wiring sheet 100 including the second base material 5 may include a second cured product layer between the electrodes 4 and the second base material 5. Specifically, in the wiring sheet 100, the pseudo sheet structure 2 and the electrodes 4 may be interposed between the cured product layer 3 and the second cured product layer, That is, in the wiring sheet 100 according to the exemplary embodiment, the first base material 1, the cured product layer 3, the pseudo sheet structure 2, the pair of electrodes 4, the second cured product layer, and the second base material 5 are provided in this order. In this arrangement, the pseudo sheet structure 2 and the electrodes 4 are more firmly fixed by the two cured product layers in the wiring sheet 100. The material, thickness, and other characteristics of the second cured product layer are similar to those of the cured product layer 3.

The wiring sheet 100 not including the second base material 5 may be attached to an adherend by providing the second cured product layer between the electrodes 4 and the adherend and adhering the wiring sheet 100 to the adherend with the adhesive agent for forming the second cured product layer. That is, in the wiring sheet 100 according to the exemplary embodiment, the first base material 1, the cured product layer 3, the pseudo sheet structure 2, the pair of electrodes 4, and the second cured product layer are provided in this order.

Alternatively, the wiring sheet 100 including the second cured product layer may only include, as a cured product layer of the invention, the second cured product layer without including the cured product layer 3. That is, in the wiring sheet 100 according to the exemplary embodiment, the first base material 1, the pseudo sheet structure 2, the pair of electrodes 4, the second cured product layer, and the second base material 5 are provided in this order. Or, in the wiring sheet 100 according to the exemplary embodiment, the first base material 1, the pseudo sheet structure 2, the pair of electrodes 4, and the second cured product layer are provided in this order.

Application of Wiring Sheet

When the wiring sheet 100 is used as a heat-generating body (sheet-shaped heater), examples of application of the heat-generating body include a defogger for window glass and a defroster. In recent years, a heater is used for controlling a temperature of a battery of electric vehicles, and a thin heater is suitable for individually controlling a temperature of each of laminated cells. Further, the wiring sheet 100 can be also used as a flat cable for wiring of an electric signal.

EXAMPLES

The invention will be described in further detail with reference to Examples. It should be noted that the scope of the invention is not limited to Examples.

Preparation Example 1

A curable adhesive agent was obtained by blending 100 parts by mass of acid-modified polyolefin resin (α-olefin polymer, produced by Mitsui Chemicals, Inc., trade name "Unistor H-200", a weight average molecular weight (Mw): 52,000), 25 parts by mass of hydrogenated bisphenol A diglycidyl ether (produced by Mitsubishi Chemical Corporation, product name "YX8034"), 0.1 parts by mass of a silane coupling agent (produced by Shin-Etsu Chemical Co., Ltd., product name "KBM-4803"), and 1 part by mass of an imidazole curing catalyst (produced by Shikoku Chemicals Corporation, product name "Curesol 2E4MZ", 2-ethyl-4-methylimidazole).

Preparation Example 2

A curable adhesive agent was obtained by blending 100 parts by mass of a phenoxy resin (produced by Mitsubishi Chemical Corporation, trade name "YX7200B35"), 170 parts by mass of hydrogenated bisphenol A diglycidyl ether (produced by Mitsubishi Chemical Corporation, product name "YX8000"), 0.2 parts by mass of a silane coupling agent (produced by Shin-Etsu Chemical Co., Ltd., product name "KBM-4803"), 2 parts by mass of a cationic thermal polymerization initiator (produced by SANSHIN CHEMICAL INDUSTRY CO., LTD., product name "SAN-AID SI-B3"), and 2 parts by mass of a cationic thermal polymerization initiator (produced by SANSHIN CHEMICAL INDUSTRY CO LTD., product name "SAN-AID SI-B7").

Preparation Example 3

Non-curing adhesive agent was obtained by blending an acrylic copolymer having n-butylacrylate as a main component and having a constituent unit derived from a material monomer added with an acrylic acid, and an isocyanate cross-linker as a cross-linker.

Preparation Example 4

An organic-inorganic hybrid material (produced by JSR Corporation, product name "OPSTAR Z7530", containing 60 parts by mass of reactive silica, 40 parts by mass of dipentaerythritol hexaacrylate, and a photopolymerization initiator) was prepared as a curable adhesive agent.

Preparation Example 5

A curable adhesive agent was obtained by blending 100 parts by mass of a phenoxy resin (produced by Mitsubishi Chemical Corporation, trade name "YX7200B35"), 70 parts by mass of an epoxy compound having an oxyalkylene chain (produced by Mitsubishi Chemical Corporation, product name "YX7400"), and 2 parts by mass of a cationic photopolymerization initiator (produced by San-Apro Ltd., product name "CPI-100P").

Example 1

A dilution obtained by diluting the adhesive agent prepared in Preparation Example 1 with a solvent was applied on a 50-μm-thick polyimide film (produced by DUPONT-TORAY CO., LTD., product name "Kapton 200H") and dried, forming a 20-μm-thick adhesive agent layer, which was cut into a rectangle of 257 mm×364 mm. An adhesive sheet was thus obtained. A tungsten wire (25 μm in diameter, produced by TOKUSAI TungMoly Co., LTD., product name "TWG-CS", hereinafter also referred to as a "wire") was prepared as conductive linear bodies. Next, the adhesive sheet was creaselessly wound on a drum member having a rubber outer circumferential surface with a surface of the adhesive agent layer facing outward, and both circumferential ends of the adhesive sheet were fixed to the drum member with a double-sided tape. The wire wound around a bobbin was attached to the surface of the adhesive agent layer of the adhesive sheet located near the end of the drum member, and then the wire was unwound from the bobbin and wound by the drum member. The drum member was gradually moved in a direction parallel to a drum axis, so that the wire was wound around the drum member spirally at equal intervals of 40 mm. As described above, a pseudo sheet structure was formed with six wires arranged on the surface of the adhesive agent layer. Then, the wires were cut and the adhesive sheet provided with the pseudo sheet structure was removed from the drum member. Subsequently, a gold-plating copper wire (150 μm in diameter, produced by TOKUSAI TungMoly Co., LTD., product name "C1100-H AuP") was prepared as electrodes. The electrodes were attached to the adhesive sheet by providing a pair of wire electrodes to extend across the tungsten wires in a direction orthogonal to the extending direction of the tungsten wires. The distance between the tungsten wires was 150 mm (see FIG. 3C). Next, a polyimide film having a thickness of 50 μm (produced by DUPONT-TORAY CO., LTD., trade name "Kapton 200H") was attached to the surface of the adhesive agent layer having the wires thereon of the film provided with the electrodes. After that, a vacuum laminator (produced by Nikko-Materials Co., Ltd., product name "V130") was used to perform thermal lamination at 100 degrees C. and 0.5 MPa for one hour, obtaining a wiring sheet. Next, the wiring sheet was cut in a 40 mm width so that a single wire was taken from the pseudo sheet structure of the wiring sheet, preparing a wiring element for evaluation. For the purpose of obtaining the wiring element, the wiring sheets in this example and other experimental examples had an interval between wires larger than that suitable for actual products.

Example 2

A wiring sheet in Example 2 was prepared as in Example 1 except that the adhesive agent in Preparation Example 2 was used instead of the adhesive agent in Preparation Example 1 in preparing the adhesive sheet, and that thermal lamination was performed at 110 degrees C. for 50 minutes. Further, a wiring element for evaluation was also prepared.

Comparative 1

A wiring sheet in Comparative 1 was prepared as in Example 1 except that the non-curing adhesive agent in Preparation Example 3 was used instead of the adhesive agent in Preparation Example 1 in preparing the adhesive sheet, and that a polyimide film was attached to the surface of the adhesive agent layer having the wires thereon of the film provided with electrodes by use of a roller-type laminator instead of thermal lamination. Further, a wiring element for evaluation was also prepared.

Comparative 2

A wiring sheet in Comparative 2 was prepared as in Example 1 except that the adhesive agent in Preparation Example 4 was used instead of the adhesive agent in Preparation Example 1 in preparing the adhesive sheet, that both the polyimide film coated with the adhesive agent and the polyimide film attached to the surface of the adhesive agent layer having the wires thereon of the film provided with electrodes were changed to a polyethylene terephthalate film (produced by TORAY INDUSTRIES, INC., product name "Lumirror T60"), and that ultraviolet radiation (an ultraviolet wavelength of 365 nm) was performed under the conditions of an illumination of 250 mW/cm$^2$ and a quantity of UV-rays of 170 mJ/cm$^2$ after thermal lamination at 40 degrees C. for two minutes. Further, a wiring element for evaluation was also prepared.

Comparative 3

A wiring sheet in Comparative 3 was prepared as in Example 1 except that the adhesive agent in Preparation Example 5 was used instead of the adhesive agent in Preparation Example 1 in preparing the adhesive sheet, that both the polyimide film coated with the adhesive agent and the polyimide film attached to the surface of the adhesive agent layer having the wires thereon of the film provided with electrodes were changed to a polyethylene terephthalate film (produced by TORAY INDUSTRIES, INC., product name "Lumirror T60"), and that ultraviolet radiation (an ultraviolet wavelength of 365 nm) was performed under the conditions of an illumination of 200 mW/cm$^2$ and a quantity of UV-rays of 2,000 mJ/cm$^2$ after thermal lamination at 40 degrees C. for two minutes. Further, a wiring element for evaluation was also prepared.

Measurement of Storage Modulus

For Example 1 and Comparatives 1 and 3, the storage modulus was measured by the following method. Specifically, an adhesive agent layer having a thickness of 20 μm was formed on a release film from the same composition as the composition forming a layer subjected to measurement, obtaining a 1-mm-thick laminate for each of Example 1 and Comparatives 1 and 3. The laminate was punched in a circle with a diameter of 8 mm, preparing a test sample in a cylindrical shape. Heating or ultraviolet radiation was performed on each test sample under the same conditions as those of each experimental example, curing the test sample. Note that, for the test sample in Example 1, heating was performed in atmospheric pressure without using a vacuum laminator, and for the test sample in Comparative 1, a process for curing was not performed. Using a viscoelasticity measuring device (produced by Anton Paar, device name "MCR300"), the storage modulus of each test sample was measured under the following conditions: a test start temperature of −20 degrees C.; a test finish temperature of 150 degrees C.; a temperature increase rate of 3 degrees C./min, and a frequency of 1 Hz.

For Example 2 and Comparative 2, the storage modulus was measured by the following method. Specifically, an adhesive agent layer having a thickness of 20 μm was formed on a release film from the same composition as the composition forming a layer subjected to measurement, obtaining a 200-μm-thick test sample for each of Example 2 and Comparative 2. Heating or ultraviolet radiation was performed on each test sample under the same conditions as those of each experimental example, curing the test sample. Note that, for the test sample in Example 2, heating was performed in atmospheric pressure without using a vacuum laminator. Using a viscoelasticity measuring device (produced by TA Instruments, device name "DMAQ800"), the storage modulus of each test sample was measured under the following conditions: a test start temperature of −20 degrees C.; a test finish temperature of 150 degrees C.; a temperature increase rate of 3 degrees C./min; and a frequency of 1 Hz.

Evaluation of Resistance Value in Wiring Sheet

The wiring element for evaluation was deformed by being wound around a round bar having a diameter of 17 mm in such a manner that an axial direction of the round bar was orthogonal to the extending direction of the tungsten wires. Then, the wiring element for evaluation was flattened again, and a voltage of 3.0V was applied to the stretched element with a DC power source. The resistance value was determined from a current value, Comparative 2 was unmeasurable because no current flowed after deformation.

TABLE 1

| | Storage Modulus (Pa) | Resistance Value (Ω) |
|---|---|---|
| Example 1 | $1.9 \times 10^7$ | 22.4 |
| Example 2 | $2.2 \times 10^9$ | 21.7 |
| Comparative 1 | $2.1 \times 10^5$ | 27.6 |
| Comparative 2 | $1.5 \times 10^{10}$ | Unmeasurable |
| Comparative 3 | $1.9 \times 10^6$ | 25.9 |

The results shown in Table 1 revealed that the wiring sheets in Examples 1 and 2 were smaller in resistance value than the sheet-type heaters in Comparatives 1 and 3. The resistance value of the wiring sheet in Comparative 2 was unmeasurable. Presumably, the connection portion(s) between the conductive linear bodies and the electrode(s) was damaged. Accordingly, it is confirmed that the invention provides a wiring sheet in which a resistance value is not likely to increase.

The invention claimed is:

1. A wiring sheet comprising:

a sheet structure comprising a plurality of conductive linear bodies arranged at intervals;

a cured product layer supporting the sheet structure; and a pair of electrodes in direct contact with the conductive linear bodies, wherein the cured product layer is formed from a cured product of a curable adhesive agent, and a storage modulus at 23 degrees C. of the cured product layer is in a range from $5.0\times10^{6}$ Pa to $1.0\times10^{10}$ Pa.

2. The wiring sheet according to claim 1, wherein the conductive linear bodies comprise a metal wire.

3. The wiring sheet according to claim 2, wherein the metal wire is formed from a single species of metal.

4. The wiring sheet according to claim 1, wherein the electrodes are metallic foil having a thickness of 40 μm or less or a metal wire.

5. The wiring sheet according to claim 1, wherein a thickness of the cured product layer is smaller than a diameter of the conductive linear bodies.

6. The wiring sheet according to claim 1, wherein the cured product layer contains no filler.

7. The wiring sheet according to claim 1, further comprising a base material on a side of the cured product layer on which the electrodes are not provided.

8. The wiring sheet according to claim 1, wherein each of the plurality of conductive linear bodies is linear-shaped in a plan view of the wiring sheet.

9. The wiring sheet according to claim 1, wherein each of the plurality of conductive linear bodies is linear-shaped in a plan view of the wiring sheet when the wiring sheet is formed.

10. The wiring sheet according to claim 1, wherein the storage modulus at 23 degrees C. of the cured product layer is in a range from $1.0\times10^{7}$ Pa to $1.0\times10^{9}$ Pa.

11. The wiring sheet according to claim 1, wherein a diameter of each of the conductive linear bodies is in a range from 5 μm to 75 μm.

* * * * *